US011350142B2

(12) United States Patent
Batra et al.

(10) Patent No.: US 11,350,142 B2
(45) Date of Patent: May 31, 2022

(54) INTELLIGENT VIDEO FRAME DROPPING FOR IMPROVED DIGITAL VIDEO FLOW CONTROL OVER A CROWDED WIRELESS NETWORK

(71) Applicant: GAINSPAN CORPORATION, San Jose, CA (US)

(72) Inventors: Vishal Batra, Bangalore (IN); Pankaj Vyas, Bangalore (IN)

(73) Assignee: GAINSPAN CORPORATION, San Jose, CA (US)

( * ) Notice: Subject to any disclaimer, the term of this patent is extended or adjusted under 35 U.S.C. 154(b) by 0 days.

(21) Appl. No.: 16/353,400

(22) Filed: Mar. 14, 2019

(65) Prior Publication Data

US 2020/0221147 A1 Jul. 9, 2020

(30) Foreign Application Priority Data

Jan. 4, 2019 (IN) .............................. 201941001561

(51) Int. Cl.
| | |
|---|---|
| *H04L 47/11* | (2022.01) |
| *H04N 21/2343* | (2011.01) |
| *H04L 47/25* | (2022.01) |
| *H04N 21/24* | (2011.01) |
| *H04L 47/263* | (2022.01) |
| *H04N 19/166* | (2014.01) |
| *H04N 21/238* | (2011.01) |
| *H04W 28/02* | (2009.01) |

(52) U.S. Cl.
CPC ..... *H04N 21/234381* (2013.01); *H04L 47/11* (2013.01); *H04L 47/14* (2013.01); *H04L 47/25* (2013.01); *H04L 47/263* (2013.01); *H04N 19/166* (2014.11); *H04N 21/23805* (2013.01); *H04N 21/2402* (2013.01)

(58) Field of Classification Search
CPC ........... H04N 21/647; H04N 21/64792; H04N 21/2343; H04N 47/11; H04N 47/12; H04N 47/18; H04N 47/10; H04N 47/25
See application file for complete search history.

(56) References Cited

U.S. PATENT DOCUMENTS

2003/0236904 A1* 12/2003 Walpole ............... H04N 21/631
709/231
2007/0154065 A1* 7/2007 Kellerer ............... H04N 19/587
382/100

(Continued)

*Primary Examiner* — Rowina J Cattungal
(74) *Attorney, Agent, or Firm* — Pearl Cohen Zedek Latzer Baratz LLP

(57) ABSTRACT

A device, system and method for intelligently dropping frames in a congested wireless network. Video frames from a video encoder may be received and queued in an ordered sequence of outgoing video frames in a transmission queue to be transmitted as data packets by a wireless communication circuit. When network congestion is detected, a relative contextual importance level of an incoming frame received from the video input channel may be compared relative to at least one frame in the transmission queue. The compared frame that has a lower relative contextual importance level may be dropped or omitted from the transmission queue, thereby transmitting data packets of the frames in the transmission queue without the dropped or omitted frames.

17 Claims, 3 Drawing Sheets

(56) References Cited

U.S. PATENT DOCUMENTS

| | | | |
|---|---|---|---|
| 2007/0296854 A1* | 12/2007 | Berkey | H04N 21/23406 |
| | | | 348/412.1 |
| 2010/0118883 A1* | 5/2010 | Jones | H04L 47/50 |
| | | | 370/412 |
| 2011/0302238 A1* | 12/2011 | Sood | G11B 27/005 |
| | | | 709/203 |
| 2013/0343398 A1* | 12/2013 | Sarca | H04L 47/32 |
| | | | 370/412 |
| 2014/0036999 A1* | 2/2014 | Ryu | H04N 19/70 |
| | | | 375/240.12 |
| 2014/0269942 A1* | 9/2014 | Mikov | H04N 19/436 |
| | | | 375/240.27 |
| 2016/0295265 A1* | 10/2016 | Li | H04N 21/6587 |
| 2017/0134282 A1* | 5/2017 | Agarwal | H04L 47/24 |
| 2017/0149639 A1* | 5/2017 | Vasseur | H04L 12/44 |
| 2017/0171099 A1* | 6/2017 | Shpiner | H04L 47/6255 |
| 2019/0109787 A1* | 4/2019 | Chen | H04L 47/266 |
| 2019/0140939 A1* | 5/2019 | Schooler | H04L 67/2833 |
| 2019/0379604 A1* | 12/2019 | Li | H04L 47/12 |

* cited by examiner

INTELLIGENT VIDEO FRAME DROPPING FOR IMPROVED DIGITAL VIDEO FLOW CONTROL OVER A CROWDED WIRELESS NETWORK

CROSS-REFERENCE TO RELATED APPLICATIONS

This application claims priority to Indian patent application 201941001561, filed Jan. 14, 2019 which is incorporated herein by reference in its entirety.

FIELD OF THE INVENTION

Embodiments of the invention relate to the field of transmitting video data over wireless networks. In particular, embodiments of the invention relate to video flow control over crowded or congested wireless networks.

BACKGROUND OF THE INVENTION

In wireless video applications, such as, video streaming and download, multi-player video games, video conferencing, and interactive multimedia applications, a video encoder may transfer video frame data to a wireless communication device. The wireless communication device may divide those frames into wireless data packets and transmit those packets over a network to a receiving device. The receiving device may have a video decoder to reassemble the video frame data from the packets, and a buffer to store the video frame data in a queue for playback. The receiving device may be a playback device (e.g., for direct real-time playback of the video) or a server-side device (e.g., to save the video to a network Cloud).

Due to the relatively high volume of data in video applications, wireless networks often experience congestion when transporting video data. The wireless communication device may accommodate such congestion by dynamically controlling the flow of data over the network, e.g., by dropping video frame packets or slowing their transmission rates. Video applications, however, are very sensitive to such packet loss and delay, which often degrades the performance of video playback.

Accordingly, there is a need in the art to improve the transmission of video data over wireless networks.

SUMMARY OF THE INVENTION

A device, system and method is provided for intelligently dropping frames in a congested wireless network. The device or system may include a wireless communication device having a wireless communication circuit configured to transmit and receive data packets over the wireless network, a video input channel configured to receive an ordered sequence of incoming video frames generated by a video encoder, and may include or may be operably connected to the video encoder. The wireless communication device may receive an ordered sequence of incoming video frames generated by the video encoder and may arrange the video frames in an ordered sequence of outgoing video frames in a transmission queue to be transmitted as data packets at an initial transmission rate, e.g., set by the wireless communication device and/or network protocol. When network congestion is detected, a relative contextual importance level of a new incoming frame received from the video input channel may be compared relative to that of at least one frame previously arranged in the transmission queue. The compared frame that has a lower relative contextual importance level may be dropped or omitted from the transmission queue, thereby transmitting data packets of the frames in the transmission queue without the dropped or omitted frames. This intelligent rules-based frame-dropping may eliminate frames of relative least or low importance in the transmission queue (i.e., at the transmission device-end and before transmission over the network). So, even though some frames are dropped, causing the actual transmission rate to be lower than the target initial transmission rate, the non-dropped frames that are transmitted are of greater contextual importance to video rendering, and thus result in improved video quality than if frames were dropped randomly (not based on contextual importance level) as in conventional systems.

BRIEF DESCRIPTION OF THE DRAWINGS

The foregoing and other objects, features, and advantages of the present invention, as well as the invention itself, is more fully understood from the following description of various embodiments, when read together with the accompanying drawings.

DETAILED DESCRIPTION OF THE INVENTION

Figure 1:
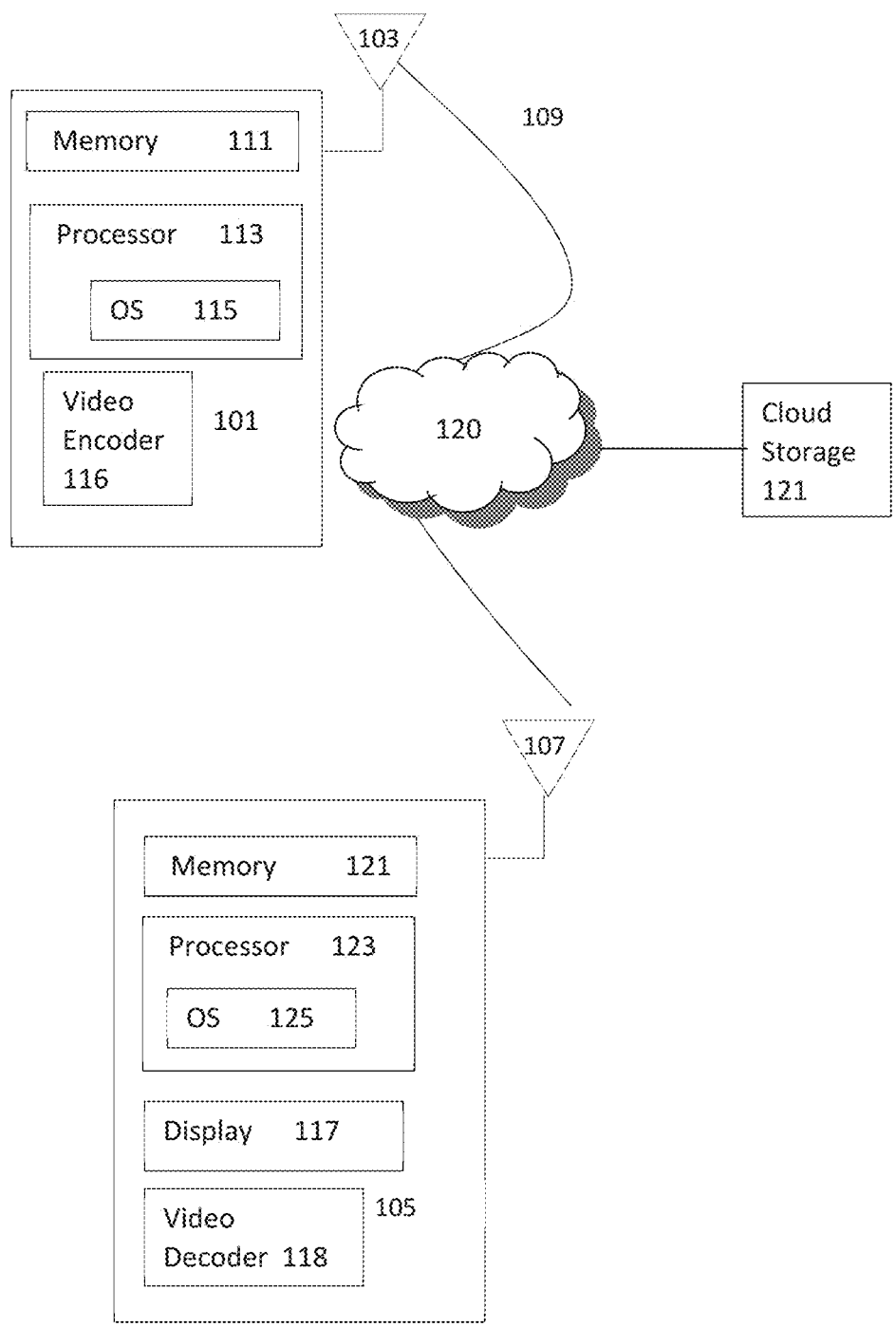
FIG. 1 schematically illustrates a system for intelligently dropping frames for improved digital video flow control over a crowded wireless network, according to an embodiment of the invention.

Wireless networks, such as Wi-Fi, are shared resources, in which network bandwidth is divided among many devices. This results in volatile network congestion, with some periods of high throughput and other periods of low throughput. Video stream encoders, on the other hand, generally output data at fixed rates (e.g., 1 Mbit/sec). During periods of network congestion, the wireless communication device cannot transmit video data fast enough to keep up with the encoder stream rate.

To minimize delays in video playback, the receiving device typically has a buffer or other short-term memory to reserve video data and give the wireless communication device extra time for transmission rates to catch up to encoder stream rates and receiver playback rates. If the network congestion persists, the reserve of buffered data may not be sufficient for the transmission rate to catch up to the playback rate, and the wireless communication device may begin to drop frames or reduce the frame quality to avoid or minimize playback delays.

Conventional wireless communication devices typically drop data frames using either a first in, first out ("FIFO") approach, where the oldest data packet in the stream (e.g., the head of the queue) is dropped until congestion is eliminated, or a last-in-first-out approach ("LIFO"), where the youngest data packet in the stream (e.g., the tail of the queue) is dropped until congestion is reduced or eliminated. Such methods of dropping frames are agnostic to the type of frame used in video compression (e.g., "IDF," "I," "P" or "B" frame types). All video compression frame types are treated equally, for example, dropping frames from either the head or tail of the queue with no preference or equal weight to all video compression frame types.

All video compression frame types, however, are not created equally. Different frame types have different levels of importance or impact on video quality. In one example of the H.264 video compression coding standard, an intra-coded picture ("I" or "IDF") type frame is a stand-alone frame that typically contains all the information necessary to render (decode and display) a complete image frame. A predicted picture ("P") type frame defines a change with respect to another (preceding) frame and thus requires the successful transmission of two frames (both itself and the other preceding frame) to render each P frame. A bidirectional predicted picture ("B") type frame defines a change with respect to two or more other frames (preceding and following the B frame) and thus requires the successful transmission of at least three frames to render each B frame. The greater the number of frames a particular frame depends on for its rendering, the more likely that one of those frames will be lost or dropped, rendering the particular frame obsolete. Thereby, a frame type that depends on the successful transmission of a fewer number of frames may be considered more important or have a higher priority (having a higher likelihood for successful rendering) as compared to a frame type that depends on the successful transmission of a greater number of frames (having a lower likelihood for successful rendering). Thus, in video applications, an "I" or "IDF" frame may be considered more important than a "P" or "B" frame, and a "P" frame is considered more important than a "B" frame.

Because conventional wireless communication devices drop frames without regard to frame type or importance, on average, all frame types (e.g., I, P, and B frames) will be dropped at the same proportional rate (e.g., the rate frames of a particular type are dropped relative to the number, proportion, frequency or total rate that frames of that type are transmitted).

An insight according to some embodiments of the invention is that wireless video transmission fidelity may be improved by wireless communication devices intelligently selecting which frames to drop according to a preferential hierarchy of frames. Frames and/or frame packets with relatively lower importance may be dropped proportionally more frequently than frames and/or frame packets with relatively higher importance. Thus, embodiments of the present invention aim to improve the performance of wireless video applications by implementing smart wireless communication devices that intelligently select which packet(s) to drop. Intelligently, selectively or preferentially dropping frames with relatively lower priority reduces network congestion and increases the fidelity of video playback, compared to randomly dropping packets without regard to frame importance as in conventional congested networks.

In some embodiments, wireless communication devices may selectively drop frames based on the importance of their different frame types. Some embodiments may drop frames at a greater proportional rate for less important frame types (e.g., P or B frames) compared to more important frame types (e.g., I or IDF frames). For example, B frames (having the lowest importance) may be dropped at the highest relative proportional rate, P frames (having the next lowest importance) may be dropped at a mid-range relative proportional rate, and I or IDF frames (having the greatest importance) may be dropped at the lowest relative proportional rate. Because a greater proportion of I frames are successfully transmitted (not dropped) compared to P and B frames, according to embodiments of the invention a greater percentage or proportion of frames may be rendered for playback (all I frames result in a successful playback of the frame, whereas some P and B frames do not if their linked frame is dropped), as compared to conventional methods.

In some embodiments, wireless communication devices may selectively drop frames based on whether or not other packets for the same frame were already dropped. For example, in the H.264 video compression coding standard, each frame may be sufficiently large (e.g., approximately 3,500 bytes), so that it is encoded by a set of multiple (N) IP packets. If one or an above threshold number of packets encoding a frame were already dropped, there is a lower likelihood that the frame will be successfully transmitted, in which case the remaining packets for the frame have less value. Accordingly, frame packets may be dropped at a higher rate for frames in which previous packets were already dropped for the same frame. In some embodiments, the likelihood of dropping a packet encoding a frame may be directly proportional to the number of frame packets previously dropped for that frame. Conversely, the likelihood of transmitting (not dropping) a packet encoding a frame may be directly proportional to the number of frame packets previously successfully transmitted for that frame. In this way, the further along a frame's transmission has succeeded, the less likely it is to fail. In other words, in a sequence of packets encoding a frame, earlier packets are more likely to be dropped than later packets encoding that frame.

In some embodiments, wireless communication devices may selectively drop frames and/or packets based on frame age or order, or GOP age or order. In real-time video playback applications, a frame that is temporally newer or ordered later in a sequence is typically more important than an older or earlier frame in the sequence. Some embodiments may have a preference to transmit newer frames over older frames (i.e., a preference to drop older frames over newer frames). For example, if a $2^{nd}$ GOP is received before a $1^{st}$ GOP is buffered, and the buffer is full, the wireless network map drop the entire $1^{st}$ GOP and transmit the $2^{nd}$ GOP in its place.

In some embodiments, when a full frame (e.g., I or IDR) is expected to be dropped, all other frames belonging to the same GOP may be dropped since the reference frame is lost, rendering the remaining frames defined relative to the reference frame useless.

In general, the wireless communication device may receive an incoming sequence of frames from the video encoder and may assemble a transmission queue of frames for packetization and transmission over the network. When the network experiences overcrowding, a subset of frames and/or packets from the encoder sequence are selectively dropped or omitted in the transmission queue. The wireless communication device may decide which candidate frames to drop or omit based on a comparison of the contextual importance of the frames. The wireless communication device may compare the importance of each or a plurality of new incoming frames received from the video encoder with one or more previously received frames in the transmission queue (e.g., the frame at the head of the transmission queue, the frame at the tail of the transmission queue, a subset of frames or all frames in the transmission queue). If the wireless communication device determines that the incoming frame is more important than the compared frame in the queue, the frame in the queue is dropped. Conversely, if the wireless communication device determines that the frame in the queue is more important than e incoming frame, the incoming frame is dropped.

Accordingly, incoming frames that are received in an ordered sequence from the video encoder, may be dropped by the wireless communication device "out-of-order" or non-chronologically, i.e., not based exclusively on the sequential or chronological order they are received from the video encoder (e.g., not exclusively FIFO or LIFO). For example, when a frame must be dropped due to network congestion, in contrast to a conventional (e.g., FIFO or LIFO) system that exclusively drops the (e.g., respectively first or last) frame in the transmission queue, the wireless communication device compares that frame in the transmission queue with a relatively newer incoming frame from the video encoder, and drops the less important frame. Selectively dropping frames based on a comparison of frame importance, and not based exclusively on chronological order (as in FIFO and LIFO systems), may increase the quality of a wirelessly transmitted video by ensuring that frames that are more contextually important are transmitted with higher priority (e.g., dropped at relatively lower proportional rates) and frames that are less contextually important are transmitted with lower priority (e.g., dropped at relatively higher proportional rates).

The contextual importance of frames may be measured by one or more metrics including, but is not limited to, frame type, priority, number of previously transmitted or dropped packets for a me GOP, relative position of a frame or GOP in a sequence, encoding or transmission time of a frame (e.g., a recent frame being more important than an older frame) number of frames that rely on the particular frame for rendering, amount of video information the frame provides, or other factors or combinations of factors defining the contextual importance of the frame as would be appreciated by a person ordinary skill in the art. In some embodiments, contextual importance may not refer to the position or order in which the frame is received from the video encoder (e.g., the basis of dropping frames in conventional FIFO or LIFO systems).

In some embodiments of the present invention, wireless communication devices may select which frames to drop by reconfiguring a medium access control ("MAC") layer of a WLAN video streaming system. In some embodiments, MAC parameters may be reconfigured including, for example, the number of transmission retries (e.g., higher for contextually important frames), the MAC level rates used for transmission (e.g., use of more resilient rates which are usually lower rates), etc. The WLAN may operate according to the Institute of Electrical and Electronics Engineers (IEEE) 802.11 standard. The IEEE 802.11 standard specifies that the MAC layer manages and maintains communications between 802.11 stations and access points by coordinating access to a shared radio channel and utilizing protocols that enhance communications over a wireless medium. The MAC layer is a sub-layer of the data link layer 2 that manages communication across physical links in the network. The MAC layer tasks include, handling the transmissions, retransmissions, buffering, and dropping of frames based on channel characteristics/parameters, such as a maximum number of transmission (or retransmission) attempts allowed for a packet (e.g., referred to as a "retry limit") or a maximum amount of time allowed for transmitting (or retransmitting) a packet (e.g., referred to as a "packet lifetime"). Often viewed as the "brains" of the network, the 802.11 MAC layer uses an 802.11 Physical (PHY) Layer or "Layer 1", e.g., according to the IEEE 802.11b or 802.11a standard, to perform the tasks of carrier sensing, transmission, and receiving of 802.11 compliant frames. Other standards, protocols, or layers may also be used.

In some embodiments of the invention, the incoming frame may be more contextually important than the frame(s) in the transmission queue (e.g., the frame at the head or tail of the queue) if the number of frames required to render (e.g., decode or display) the incoming frame is less than the number of frames required to render the frame(s) in the transmission queue. As explained above, a particular frame that requires a greater number of accompanying frames to be rendered is less likely to be successfully rendered, due to the increased likelihood of dropping one of the accompanying frames, and therefore is determined to be less contextually important than another frame that requires a relatively fewer number of accompanying frames to be rendered.

Accordingly, a reference frame (e.g., an I or IDF frame) does not need any other frame to be rendered in a video stream, and so may have the highest contextual importance of any frame type. If the incoming frame is a reference frame, and there are no reference frames in the transmission queue, the incoming frame may be more contextually important than all the frames in the queue. If the incoming frame is a non-reference frame (e.g., P or B frame) and the queue contains a reference frame, the incoming frame may be more contextually important than all frames at the head of the queue up until a reference frame in the queue. If both the incoming frame and the frame in the transmission queue (e.g., at the head of the queue) are reference frames, greater contextual importance may be given to the incoming reference frame than the queued reference frame because it is better to lose a sequence of queued frames which is outdated in time (older) than to lose an incoming reference frame which may be reference by the next (newer) incoming frame.

If the number of frames required to render the incoming frame is less than or equal to (not more than) the number of frames required to render the frame in the transmission queue, the incoming frame may be more contextually important than the frame in the transmission queue because queued frames contain outdated information relative to the newer incoming frames. If the number of frames required to decode or display the incoming frame is more than the number required by the frame in the transmission queue, the frame in the transmission queue may be more contextually important than the incoming frame.

Figure 2:
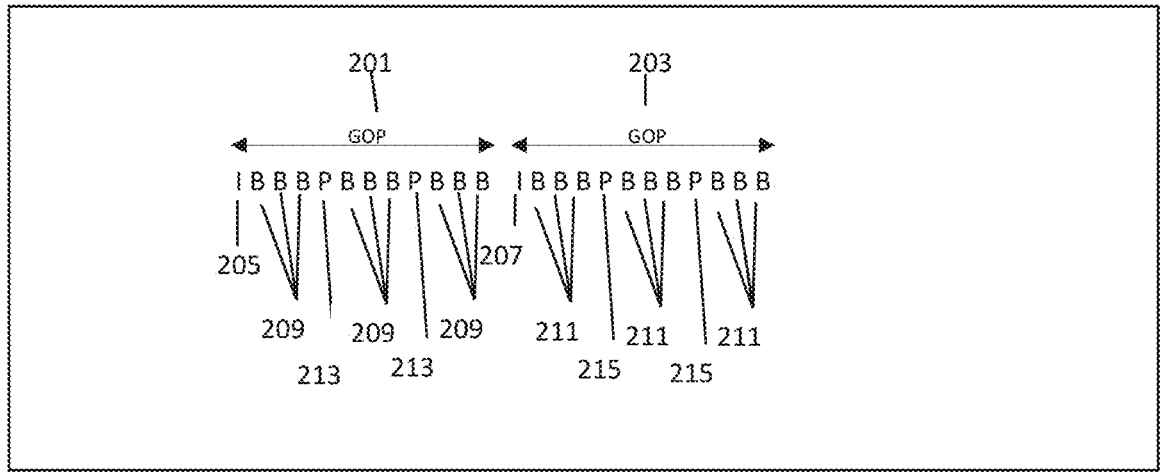
FIG. 2 schematically illustrates an example breakdown of the types of frames transmitted in two groups of pictures ("GOP"), according to an embodiment of the invention.

In some examples, an encoded video stream includes a sequence of successive groups of pictures ("GOPs"), where each GOP is a continuous sequence of video frames that relate to the same single reference frame, as shown in FIG. 2.

Reference is made to FIG. 2, which schematically illustrates an example breakdown of the types of frames transmitted in two groups of pictures ("GOPs"), according to an embodiment of the invention.

The first GOP 201 may start with an I frame 205 followed by a plurality of B frames 209 and P frames 213. The second GOP 203 may start with an I frame 207 followed by a plurality of B frames 211 and P frames 215.

I frames typically carry more information than P frames, and P frames typically carry more information than B frames. More specifically, I frames are intra-coded pictures (e.g., pictures that are coded independently of all other pictures) which can be complete images, such as a JPG or BMP image file. I frames are independent frames that generally contain the full information associated with an individual image frame, i.e., a reference frame.

An instantons decoder refresh ("IDR") frame is a special type of I-frame in the H.264 specification. An IDR frame specifies that no frame after the IDR frame can reference any frame before it. All frames transmitted subsequently to the IDR frame can be decoded without reference to any frame decoded prior to the IDR frame. An IDR frame may be assigned a higher importance than an I frame.

In contrast, P and B frames hold only part of the information for a particular image frame (e.g., the difference between the image frame and another reference frame). P frames, also known as delta-frames, are dependent on one or more previous I or P frames, generally defining only a difference or delta in the associated image relative to the previous frames, which may result in greater compression than I-frames. For example, in a scene where a foreground object moves across a stationary background, substantially only the object's movements are encoded. The encoder does not need to represent the unchanging background pixels in the P frame, thus reducing the amount of data used to represent P frames relative to I frames.

B frames are dependent on one or more previous or forward I or P frames and generally result in the highest amount of data compression by defining only the differences between the current frame and both the preceding and following frames to specify its content. Accordingly, a B frame requires more contextual information for reconstruction of the associated video frame than a P frame, and a P frame requires more contextual information for reconstruction of the associated video frame than an I frame.

Reference frames, such as IDR and I frames, are typically the most important frames in a GOP for reconstruction of the video because each IDR/I frame independently represents a complete picture. Because an IDR/I frame has more information than the P and B frames, multiple P and/or B frames may need to be dropped to create an equivalent reduction in bandwidth than if an IDR/I frame were dropped. Therefore, the wireless communication device may drop the least contextually important one or more P and/or B frames to make room for a new I/IDR frame received from the encoder. In contrast, conventional systems do not drop frames based on contextual importance, but rather simply drop the frame that happens to be at the head (FIFO) or tail (LIFO) of the transmission queue at the time of congestion. By dropping frames based only on their position at the head or tail of the queue, the wireless communication device would end up dropping a more important I/IDR frame in that transmission queue, which would result in a patchier video than if a newer but less important incoming P and/or B frame were dropped instead according to embodiments of the invention.

In the example of a H.264 encoding scheme, an IDR frame acts as a reference frame to the subsequent P and B frames in each GOP. Without the IDR frame acting as a reference frame for a data stream, the P and B frames which only include incremental changes to the IDR are essentially useless for reconstructing the video. Similarly, I frames are more important than their corresponding P and B frames because the P and B frames only include information on how the I frame should change, and, thus, P and B frames are not decodable or displayable without their corresponding I frame.

Further, as discussed, P frames are typically more contextually important than B frames because P frames include more information than B frames. This is because P frames only require information from the previous frame to decode whereas B frames require information from both the previous and subsequent frame to decode. In other words, there is a twice as high a chance that a P frame will be decoded than a B frame because it is twice as likely that either one of the previous or forward frames of a B frame (both necessary for decompressing the B frame) could be lost, than the chance of losing only a single previous frame used to decompress the P frame.

Further, in cases where a significant or above threshold number of frames are dropped, it is important to generate complete pictures. For example, if an above threshold number or proportion of frames are dropped, one embodiment may only transmit or buffer reference frames (e.g., I or IDF frames), and drop all non-reference frames (e.g., P or B frames).

In contrast to conventional systems and method that drop frames based only on the order that the frames appear in a transmission queue (e.g., FIFO or LIFO), but do not consider the contextual characteristics of those frames, embodiments of the present invention significantly improves video playback quality on a congested network by selectively dropping frames based on their contextual importance, thereby keeping the most valuable frames that are most likely to be rendered or result in the greatest number of other frames being rendered.

For example, data frames with the least amount of contextual information (e.g., information necessary to reconstruct the video), which are the least likely to be noticed as missing during playback, are dropped with highest priority, whereas frames with higher contextual information, which are more likely to be noticed if dropped, are dropped with lowest priority. By dropping frames inversely proportionally to their measure of contextual importance (e.g., how likely are the frames going to be noticed as missing during playback if dropped), embodiments of the present invention can manage network congestion while improving the quality of video playback.

Embodiments of the present invention may decide to drop a particular frame based on how much information is contained in the frame and/or how many other frames rely on the particular frame for their decoding. More specifically, the wireless communication device may decide which candidate frame(s) to drop based on the type of incoming frame (e.g., IDR, I, P, or B frame). For example, in the H.264 encoding scheme, which utilizes IDR, I, P, and B frames, the wireless communication device may drop frames in the following order: B-frames first, followed by P-frames, followed by I-frames, followed by IDR frames last.

In some embodiments, whenever a reference frame, such as an I or IDR frame, is a candidate considered to be dropped, the wireless communication device may instead drop all other frames belonging to the same GOP as that I or IDR frame (e.g., instead of or in addition to dropping the reference frame). As explained above, B and P frames of a GOP are essentially useless without their reference I or IDR frame, because the B and P frames only contain the incremental differences that are to be applied to the reference frame. Thus, B and P frames necessarily need the I or IDR frame to be useful in reconstructing video.

In some embodiments of the invention, whenever dropping a frame causes a major disruption in the video playback, the wireless communication device may send a request to the encoder to retransmit a new instance of the dropped frame. A major disruption may occur when extended congestion on the wireless network causes dropping of a large number of and/or contextually important frames, such as, I and/or IDR frames. For example, a major disruption may be defined as the loss of an above threshold number of one or more reference frame(s) and/or non-reference frame(s) (e.g., more than N=1 reference frames and/or more than M=5 non-reference frames, where N and M are configurable by user).

Reference is made to FIG. 1 which schematically illustrates a system for intelligently dropping frames for improved digital video flow control over a crowded wireless network, according to an embodiment of the invention.

The system of FIG. 1 may include a wireless communication device 101 configured to transmit a sequence of video packets 109 over a wireless network 120 to a receiving device, such as, a video playback device 105 (e.g., for direct video playback) or to a storage device e.g., in the Cloud (e.g., for later playback). Wireless network 120 may be for example a WLAN and may be operated by one or more base station(s) or access point(s).

The wireless communication device 101 may be operably connected to a video encoder 116, such as, for example, in a smartphone, personal computer, desktop computer, mobile computer, laptop computer, notebook computer, personal digital assistant (PDA), video camera, video game console, virtual or augmented reality device, drone, IoT device, etc. The wireless communication device 101 may be integral to or external to a video camera or other video source. The wireless communication device 101 may include an antenna or transceiver 103 for transmitting the video packets 109 over the wireless network 120 to the receiving device 105 or 121. Typically the information for a single video frame is transmitted in multiple data packets. For example, in the H.264 video compression coding standard, each P or B frame is approximately 3,500 bytes and each I or IDR frame is approximately 30,000 bytes, and may be encoded by many data packets. The wireless communication device 101 includes one or more processors 113, which can execute software residing in an operating system ("OS") 115, to operate according to embodiments of the invention, including selectively dropping frames. The wireless communication device 101 includes one or more memories 111, which may store data according to embodiments of the invention, including incoming frames from the video encoder 116 and outgoing frames and/or packets 109 in one or more transmission queue(s). The memory 111 may include, for example, a read only memory ("ROM"), a random access memory ("RAM"), a dynamic RAM ("DRAM"), a flash memory, a volatile memory, a non-volatile memory, a cache memory, a buffer, or other suitable permanent, long-term or short-term memory units or storage units. The memory 111 may store the frames and/or packets in a temporary memory such as a buffer or cache.

The receiving device 105 and/or 121 may be operably connected to a video decoder 118 and a wireless receiver interface. The receiving playback device 105 may be for example, a smartphone, personal computer, desktop computer, mobile computer, laptop computer, notebook computer, personal digital assistant (PDA), video camera, video game console, virtual or augmented reality device, drone, IoT device, etc. The receiving Cloud device 121 may be for example, a server or database, or a network of servers or databases. The receiving device 105 and/or 121 may include an antenna or transceiver 107 for receiving the video packets 109 transmitted by the wireless communication device 101 over the wireless network 120. The receiving playback device 105 may include or be in communication with a display 117 for viewing the video once the video packets 109 have been received and rendered by the receiving device 105 and/or transferred from the Cloud storage 121. The receiving device 105 and/or 121 includes one or more processors 123 which can execute software residing in an operating system ("OS") 125, for example, for receiving the sequence of packets 109. The receiving device 105 includes one or more memories 121, such as, for example, a read only memory ("ROM"), a random access memory ("RAM"), a dynamic RAM ("DRAM"), a flash memory, a volatile memory, a non-volatile memory, a cache memory, a buffer, or other suitable permanent, long-term or short-term memory units or storage units. The memory 121 can include a temporary memory for buffering, caching, or temporarily storing video packets 109 in a queue for playback.

Network congestion may be detected by wireless communication device 101. In one embodiment, wireless communication device 101 monitors network congestion (e.g., by detecting a Clear Channel Assessment (CCA)) to detect when the device 101 is allocated a reduced or less than threshold segment of network bandwidth. Additionally or alternatively, wireless communication device 101 may detect network congestion when memory 111 storing the transmission queue fills and the available memory falls below a predetermined threshold. When such reduced network resources are detected, the wireless communication device 101, via its one or more processors 113, may determine which incoming frames from the video encoder 116 to drop.

One or more processor(s) 113 may be configured to compare one or more newest incoming frames from the video encoder 116 to one or more outgoing transmission frames temporarily stored in the e.g., buffer memory 111, to determine which of those frame(s) to drop based on their relative contextual importance. For example, the processor 113 may be configured to preferentially drop B frames before dropping P frames. The processor 113 may be configured to preferentially drop P frames before dropping I frames. The processor 113 may be configured to preferentially drop I frames before dropping IDR frames.

In an embodiment, the processor 113 may be configured to, whenever a reference frame (e.g., an I or IDR frame) is expected to be dropped, drop all other frames belonging to the same GOP of the reference frame (in addition to, or instead of, dropping the reference frame).

In some embodiments of the invention, the processor 113 may be configured to re-transmit a new frame whenever a major disruption is introduced due to the dropping of the frame. A major disruption may occur, e.g., when an above threshold number or combination of one or more reference and/or non-reference frame(s) are lost.

In an embodiment, the processor 113 may be configured to determine which frame(s) to drop based on the type of incoming frame, the type of frame in the transmission queue, and/or how many I or IDR frames are in the transmission queue.

In an embodiment, the processor 113 may be configured to drop a frame in the transmission queue (e.g., the frame at the head or tail of the queue) to make room for an incoming frame (e.g., received from the video encoder 116) if the number of other frame(s) required in order to render (e.g., decode or display) the incoming frame is less than or equal to the number of other frame(s) required in order to render the frame in the transmission queue. For example, in this scenario, the processor 113 may be configured to drop only the frame in the transmission queue if there is no reference frame in the queue. However, if there is a reference frame in the queue, the processor 113 may be configured to drop all frames from the end (head or tail) of the queue up until the reference frame.

In an embodiment, the processor 113 may be configured to drop only the frame in the transmission queue if both the incoming frame and frame in the transmission queue are B frames and there are no I or IDR frames in the queue. However, if there is an I or IDR frame in the queue, the processor 113 may be configured to drop all frames in the transmission queue from the end of the queue (e.g., head or tail frame) up until the I or IDR frame.

In an embodiment, the processor 113 may be configured to drop only the frame in the transmission queue if the incoming frame is a P frame, the frame in the transmission queue is either a B or P frame, and there are no I or IDR frames in the queue. However, if there is an I or IDR frame in the queue, the processor 113 may be configured to drop all frames in the transmission queue from the end of the queue up until the I or IDR frame.

In an embodiment, the processor 113 may be configured to drop the incoming frame if the incoming frame requires multiple other frames in order to be rendered, but the frame in the transmission queue only requires one other frame in order to be rendered. However, if there is a reference frame in the queue, the processor 113 may be configured to drop all frames in the transmission queue from the end of the queue up until the reference frame.

In an embodiment, the processor 113 may be configured to drop the incoming frame if the incoming frame is a B frame, the frame at the head of the queue is a P frame, and there is no I or IDR frame in the queue. However, if there is an I or IDR frame in the queue, the processor 113 may be configured to drop all frames in the transmission queue from the end of the queue up until the I or IDR frame.

In an embodiment, the processor 113 may be configured to drop the incoming frame if the incoming frame uses the frame at the end of the queue in order to be rendered, and the frame at the end of the queue is the only reference frame in the queue. However, if the frame at the end of the queue is not the only reference frame in the queue, the processor 113 may be configured to drop all frames in the transmission queue from the end of the queue up until the reference frame.

In an embodiment, the processor 113 may be configured to drop the incoming frame if the incoming frame is a B frame and the frame at the end of the queue is the only I or IDR frame in the queue. However, if the frame at the end of the queue is not the only I or IDR frame in the queue, the processor 113 may be configured to drop all frames in the transmission queue from the end of the queue up until the I or IDR frame subsequent to the I or IDR frame at the end of the queue.

In an embodiment, the processor 113 may be configured to drop a frame in the transmission queue to make room for an incoming frame if the incoming frame only requires one other frame in order to be rendered, and the frame in the transmission queue is not a reference frame. More specifically, in this scenario, the processor 113 may be configured to drop only the frame in the transmission queue if there is no reference frame (a frame that does not need any other frame to be decoded or displayed) in the queue. However, if there is a reference frame in the transmission queue, the processor 113 may be configured to drop all frames in the transmission queue from the end of the queue up until the reference frame. In this scenario, if the frame at the end of the queue is the only reference frame in the queue, the processor 113 may be configured to drop the incoming frame and request a new reference frame from video encoder 116. However, if the frame at the end of the queue is not the only reference frame in the queue, the processor 113 may be configured to drop all frames in the transmission queue from the end of the queue up until the subsequent reference frame.

In an embodiment, the processor 113 may be configured to drop only the frame in the transmission queue if the incoming frame is a P frame, the frame in the transmission queue is a B or P frame, and there is no I or IDR frame in the transmission queue. If there is an I or IDR frame in the queue, the processor 113 may be configured to drop all frames in the transmission queue from the end of the queue up until the I or IDR frame in the queue. The processor 113 may be configured to drop the incoming frame and request a new IDR frame if the incoming frame is a P frame and the frame in the transmission queue is the only I or IDR frame in the queue. If the frame in the transmission queue is not the only I or IDR frame in the queue, the processor 113 may be configured to drop all frames in the transmission queue from the end of the queue up until the subsequent I or IDR frame in the queue.

In an embodiment, the processor 113 may be configured to drop all frames in the queue if the incoming frame is a reference frame and there is no reference frame in the queue. However, if there is a reference frame in the queue, the processor 113 may be configured to drop all frames in the transmission queue from the end of the queue up until the reference frame in the queue.

In an embodiment, the processor 113 may be configured to drop all frames in the queue if the incoming frame is an I or IDR frame, the frame in the transmission queue is a B or P frame, and there is no I or IDR frame in the queue. However, if there is an I or IDR frame in the queue, the processor 113 may be configured to drop all the frames in the transmission queue from the end of the queue up until the I or IDR frame in the queue.

In an embodiment, the processor 113 may be configured to, if both the incoming frame and the frame at the head of the queue are reference frames, and the frame at the head of the queue is the only reference frame in the queue, drop the reference frame at the head of the queue along with the frames in the queue that require the reference frame at the head of the queue to be rendered, or drop a frame from the tail of the queue and request a new reference frame.

In an embodiment, the processor 113 may be configured to drop the frame at the head of the queue along with the frames in the queue that require the frame at the head of the queue if the incoming frame is an I frame and the frame at the head of the queue is an I frame. If the incoming frame is an I frame, the frame at the head of the queue is not the only frame in the queue, the processor 113 may be configured to drop a frame from the tail of the queue and request an IDR frame. If the incoming frame is an IDR frame and the frame at the head of the queue is an I or IDR frame, the processor 113 may be configured to either drop all frames in the queue or to drop all the frames in the transmission queue from the end of the queue up until an IDR frame which is subsequent to the IDR frame at the end of the queue.

Figure 3:
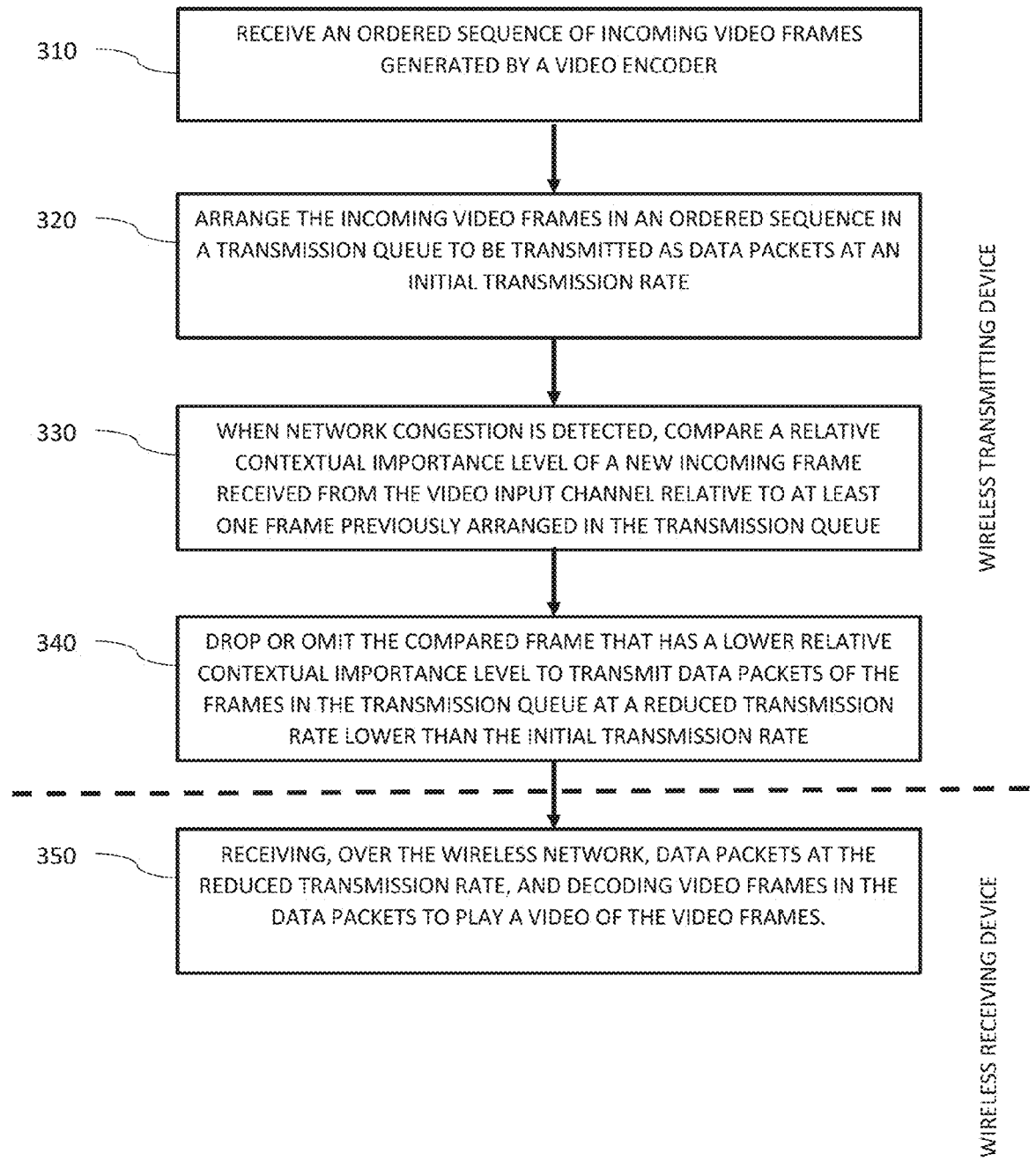
FIG. 3 is a flowchart of a method for intelligently dropping frames in a wireless network, according to an embodiment of the invention.

Reference is made to FIG. 3, which is a flowchart of a method for managing network congestion by intelligently dropping frames, according to an embodiment of the invention. Operations of FIG. 3 may be performed for example using the system of FIG. 1. For example, operations 310-340 may be executed by a wireless transmitting device 101 using one or more processor(s) 113 of FIG. 1, and operation 350 may be executed by a wireless receiving device 105 using one or more processor(s) 123 of FIG. 1. Other computing devices or systems, as well as other operations or orders of the operations, may also be used.

In operation 310 a processor at a wireless transmitting device (e.g., processor 113 of wireless communication device 101 of FIG. 1) may receive, over a video input channel, an ordered sequence of incoming video frames generated by a video encoder (e.g., 116 of FIG. 1).

In operation 320, the processor may arrange a plurality of the incoming video frames in an ordered sequence of outgoing video frames in a transmission queue (e.g., stored in a memory 111 of FIG. 1) that are scheduled to be transmitted as data packets at an initial transmission rate by a wireless communication circuit (e.g., via antenna 103 of FIG. 1). The initial transmission rate may be set by the wireless protocol, network or wireless device.

In operation 330, when network congestion is detected (e.g., over network 120 of FIG. 1), the processor may compare a contextual importance level of a new incoming frame received from the video input channel relative to the contextual importance level of at least one frame previously arranged in the transmission queue. The contextual importance level of a frame may be based on one or more metrics including any combination of: frame type, number of previously transmitted or dropped packets for the frame or a group of pictures ("GOP") containing the frame, relative position of the frame or a GOP containing the frame in the ordered sequence of incoming video frames, encoding or transmission time of the frame, number of other frames that the frame relies on for rendering, number of other frames that rely on the frame for rendering, and amount of video information the frame contains. The at least one frame that is compared in the transmission queue may include a frame at the head of the transmission queue, a frame at the tail of the transmission subset of frames in the transmission queue and/or all frames in the transmission queue.

In operation 340, the processor may drop or omit the compared frame from the transmission queue that is determined to have the lower relative contextual importance level to transmit data packets of the frames in the transmission queue without the dropped or omitted frames. While the number of transmitted frames are reduced, thereby reducing the transmission rate to be lower than the initial transmission rate, the transmitted (non-dropped) frames have relatively higher contextual importance level than if frames were dropped randomly (not based on contextual importance level) as in conventional systems. Thus, the quality of video rendered from the frames transmitted according to embodiments of the invention is improved compared to conventional systems.

In some embodiments, the processor may determine the relative contextual importance level of the frames based on frame type, such that reference frame types have a greater elative contextual importance level than delta frame types. For example, when operating according to the H.264 video compression coding standard, the processor may assign a highest to lowest relative contextual importance level to frames that have IDR-frame types, I-frame types, P-frame types, and B-frame types, respectively. In some embodiments, the processor may determine the relative contextual importance level of a particular frame inversely proportionally to a number of other frames required to render the particular frame.

In some embodiments, frames are dropped or omitted in a non-chronological order different than the order in which the frames are received from the video input channel. For example, a relatively newer incoming frame may be dropped or omitted from the transmission queue when the compared relatively older outgoing frame in the transmission queue has a greater relative contextual importance level than the newer incoming frame. In some embodiments, multiple comparison stages may be used to determine which frame(s) to prioritize and which frame(s) to drop or omit. In one embodiment, when a primary measure of contextual importance of the frames match or is not substantially different, a secondary measure contextual importance of the frames may be subsequently compared to determine which frame to drop or omit. For example, the relative contextual importance level of the incoming frame may initially be compared to that of an oldest outgoing frame at the head of the transmission queue. However, when both compared frames have the same or an above threshold contextual importance level, the processor may subsequently compare the relative contextual importance level of the incoming frame or the frame at the head of the transmission queue to that of a newest outgoing frame at the tail of the transmission queue. The frame with the lowest contextual importance may be dropped, or if the frame at the tail of the transmission queue also has a contextual importance level above the threshold, a third comparison of the contextual importance level of those frames to another frame in the transmission queue may be made. This process may iteratively continue for a sequence of frames in the transmission queue until a below threshold contextual importance level is detected and the associated one or more frame(s) are dropped or omitted. In some embodiments, when the compared frames have the same contextual importance level or parameter, such as, the same frame type, the processor may prioritize or add a relatively newer incoming frame to the transmission queue and drop or omit a relatively older outgoing frame from the transmission queue.

In some embodiments, when a reference frame is dropped, the processor may drop or omit all delta frames (e.g., P or B-frames) or an entire GOP associated with a dropped reference frame, since they can not be decoded without the dropped reference frame. In some embodiments, the processor may receive a re-transmit request to transmit a new instance of a dropped frame when dropping the frame causes a significant disruption in video playback.

In operation 350, a processor at a wireless receiving device (e.g., processor 123 of video playback device 105 of FIG. 1) may receive the transmitted data packets over the wireless network, and decode video frames in the data packets (e.g., at video decoder 118 of FIG. 1) to play a video of the video frames (e.g., via display 117 of FIG. 1).

The "transmission rate" may refer to the video transmission rate or video bit rate (the rate at which the video data is transmitted end-to-end from the encoder, over the network, to the decoder). This video transmission rate is different than the MAC layer transmission rate. This video transmission rate may be implicitly reduced due to dropping frames, e.g., even when the explicit transmission rate set by the system stays the same. Because embodiments of the invention drop or omit frames of relative least or low contextual importance level in the transmission queue, those frames may be used to reconstruct higher quality video, as compared to conventional systems which transmit frames at the same transmission rate with no preference for dropping frames based on contextual importance level.

In the foregoing description, various aspects of the present invention are described. For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well known features may be omitted or simplified in order not to obscure the present invention.

Although embodiments of invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

The invention claimed is:

1. An IoT wireless communication device comprising:
   a wireless communication circuit configured to transmit and receive data packets over a wireless network; and
   a video input channel configured to receive an ordered sequence of incoming video frames generated by a video encoder of a video source;
   one or more processors configured, at the IoT wireless communication device integral to the video source and before transmission over the wireless network to a receiving device, to:
      arrange a plurality of the incoming video frames in an ordered sequence of outgoing video frames in a transmission queue to be transmitted as data packets by the wireless communication circuit;
      detect network congestion when the wireless communication circuit cannot transmit data packets fast enough to keep up with an encoding rate of the video encoder; and
      when network congestion is detected, compare a relative contextual importance level of an incoming frame received from the video input channel relative to a relative contextual importance level of the oldest outgoing frame at the head of the transmission queue, and
         if at least one of the compared frames has a relative contextual importance level that is not above a threshold level, drop or omit the compared frame from the transmission queue that is determined to have the lower relative contextual importance level to transmit data packets of the frames in the transmission queue without the dropped or omitted frames, or
         if both compared frames have a relative contextual importance level above the threshold level, drop or omit an outgoing frame from transmission queue that has a relative contextual importance level that is below the threshold level.

2. The wireless communication device of claim 1, wherein the one or more processors are configured to drop or omit frames in a non-chronological order different than the order in which the frames are received from the video input channel.

3. The wireless communication device of claim 2, wherein the one or more processors are configured to drop or omit a relatively newer incoming frame from the transmission queue when the compared relatively older outgoing frame in the transmission queue has a greater relative contextual importance level than the newer incoming frame.

4. The wireless communication device of claim 1, wherein when both compared frames have an above threshold contextual importance level, the one or more processors are configured to subsequently determine whether to drop a newest outgoing frame at the tail of the transmission queue.

5. The wireless communication device of claim 1, wherein the one or more processors are configured to determine the relative contextual importance level of the frames based on frame type, such that reference frame types have a greater relative contextual importance level than delta frame types.

6. The wireless communication device of claim 5, wherein the one or more processors, operating according to the H.264 video compression coding standard, are configured to assign a highest to lowest relative contextual importance level to frames that have IDR-frame types, I-frame types, P-frame types, and B-frame types, respectively.

7. The wireless communication device of claim 1, wherein the one or more processors are configured to determine the relative contextual importance level of a particular frame inversely proportionally to a number of other frames required to render the particular frame.

8. The wireless communication device of claim 1, wherein the one or more processors are configured to add a relatively newer incoming frame to the transmission queue and drop a relatively older outgoing frame from the transmission queue when the frames have the same frame type.

9. The wireless communication device of claim 1, wherein the one or more processors are configured to determine the contextual importance level of a frame based on one or more metrics selected from the group consisting of: frame type, number of previously transmitted or dropped packets for the frame or a group of pictures ("GOP") containing the frame, relative position of the frame or a GOP containing the frame in the ordered sequence of incoming video frames, encoding or transmission time of the frame, number of other frames that the frame relies on for rendering, number of other frames that rely on the frame for rendering, and amount of video information the frame contains.

10. The wireless communication device of claim 1, wherein when a reference frame is dropped, the one or more processors are configured to drop or omit all delta frames, or an entire GOP associated with a dropped reference frame.

11. The wireless communication device of claim 1, wherein the one or more processors transmit a new instance of a dropped frame when dropping the frame causes a significant disruption in video playback.

12. A method for managing network congestion, the method comprising:
   at an IoT wireless communication device that is integral to a video source, before transmission over the wireless network to a receiving device:
      receiving an ordered sequence of incoming video frames generated by a video encoder of the video source;
      arranging a plurality of the incoming video frames in an ordered sequence of outgoing video frames in a transmission queue to be transmitted as data packets by a wireless communication circuit;
      detecting network congestion when the wireless communication circuit cannot transmit data packets fast enough to keep up with an encoding rate of the video encoder;

when network congestion is detected, comparing a relative contextual importance level of an incoming frame received from the video input channel relative to a relative contextual importance level of the oldest outgoing frame at the head of the transmission queue; and if at least one of the compared frames has a relative contextual importance level that is not above a threshold level, dropping or omitting the compared frame from the transmission queue that is determined to have the lower relative contextual importance level to transmit data packets of the frames in the transmission queue without the dropped or omitted frames, or if both compared frames have a relative contextual importance level above the threshold level, dropping or omitting an outgoing frame from transmission queue that has a relative contextual importance level that is below the threshold level.

13. The method of claim 12 comprising dropping or omitting the frames in a non-chronological order different than the order in which the frames are received from the video input channel.

14. The method of claim 13 comprising dropping or omitting a relatively newer incoming frame from the transmission queue when the compared relatively older outgoing frame in the transmission queue has a greater relative contextual importance level than the newer incoming frame.

15. The method of claim 13, wherein when both compared frames have an above threshold contextual importance level, subsequently determine whether to drop a newest outgoing frame at the tail of the transmission queue.

16. The method of claim 12 comprising determining the relative contextual importance level of the frames based on frame type, such that reference frame types have a greater relative contextual importance level than delta frame types.

17. The method of claim 12 comprising determining the contextual importance level of a frame based on one or more metrics selected from the group consisting of: frame type, number of previously transmitted or dropped packets for the frame or a group of pictures ("GOP") containing the frame, relative position of the frame or a GOP containing the frame in the ordered sequence of incoming video frames, encoding or transmission time of the frame, number of other frames that the frame relies on for rendering, number of other frames that rely on the frame for rendering, and amount of video information the frame contains.

* * * * *